Oct. 1, 1957    W. MORETTI ET AL    2,808,082
PORTABLE POWER FREE END JIG SAW
Filed Sept. 23, 1955
FIG. 1
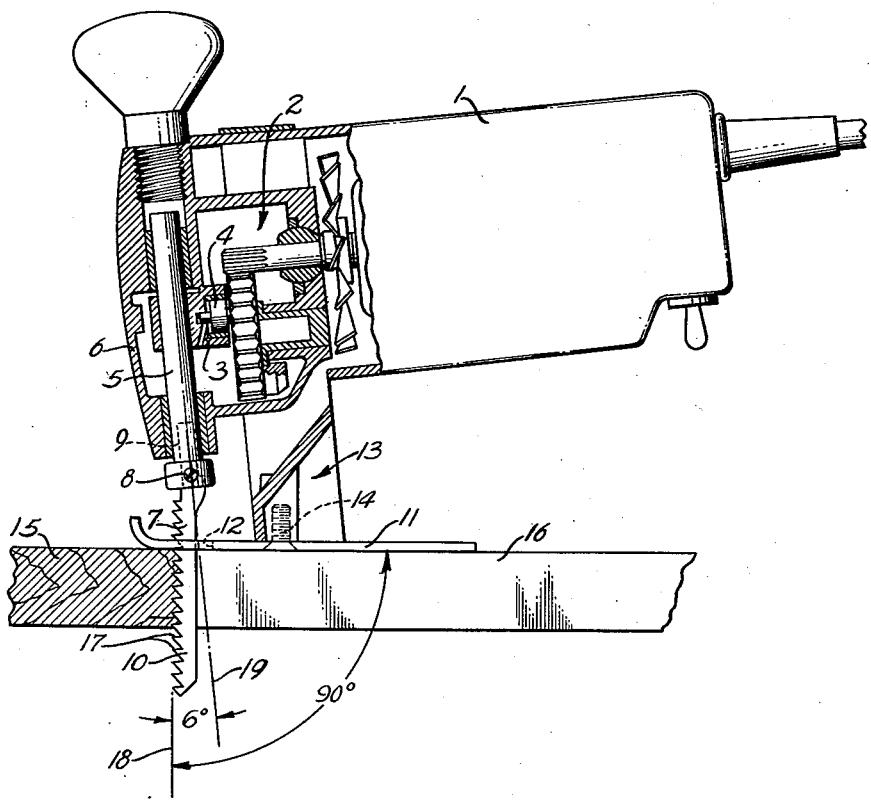
FIG. 2
FIG. 3
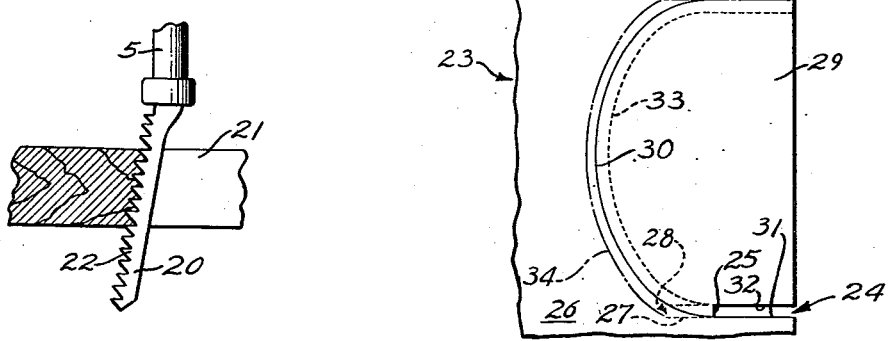
INVENTORS
WHITFIELD MORETTI
LEONARD C. PRATT
BY  Chapin + Neal
ATTORNEYS

United States Patent Office 2,808,082
Patented Oct. 1, 1957

2,808,082

PORTABLE POWER FREE END JIG SAW

Whitfield Moretti, Millers Falls, and Leonard C. Pratt, Greenfield, Mass., assignors to Millers Falls Company, Greenfield, Mass., a corporation of Massachusetts Application September 23, 1955, Serial No. 536,095

2 Claims. (Cl. 143—68)

The invention relates to improvements in power operated saws of the reciprocating type, known as jig saws, and more particularly to a jig saw in which the cutting teeth of the saw blade are fixed at a forwardly directed angle with respect to the axis of reciprocation of the plunger driving the blade.

An object of the invention is to provide a power jig saw particularly of the hand carried type with means by which the user may not only cut more easily and smoothly along a straight linear path with the advantages obtained by having the saw blade forwardly directed at an angle to the axis of the driving plunger but also to construct the same so that the user may conveniently cut a perpendicular curvilinear kerf in a flat work piece.

The objects and advantages of the invention will be best understood from the following disclosure thereof.

In the drawings,

Fig. 1 is a side elevational view of the new jig saw with portions of the casing cut away and indicating the blade thereof making a cut in a flat work piece;

Fig. 2 is a fragmentary diagrammatical view showing a cut in a workpiece as made by a saw blade and plunger of the prior art; and Fig. 3 is a schematic view of a work piece to indicate the operation of the new saw in cutting along an arcuate path.

One of the essential features of the invention is to relate the longitudinal and transverse components of motion of an angled jig saw blade to the work piece so that no one tooth of the saw engages the work in advance of another tooth. The advantages flowing from this feature will be best appreciated from a comparison of the present device with prior art as discussed below.

Fig. 1 shows a typical electric motor operated jig saw casing unit adapted for hand use, the casing or body member 1 enclosing a usual motor and having a shaft drive assembly indicated at 2 for driving a cross head 3 by an eccentric crank roller 4 in a well known manner and for converting the rotary motion to a reciprocating movement. The cross head 3 as will be understood is fixed to a plunger or saw-bar 5 mounted for reciprocation in a plunger frame 6.

The plunger at its lower end extends outwardly of the frame 6 and is provided with a socket for receiving the shank of an angularly related saw blade 7, a set screw at 8 indicating the means for fixing the shank at 9 in the plunger socket.

A forwardly angled lower end of the blade is indicated at 10. A shoe plate or sole plate 11 is provided with a forked front end, the conventional slot thereof being indicated at 12 for straddling the blade at each side thereof. The shoe is mounted by a depending bracket member 13 and mounting screw 14 at the underside of casing 1 rearwardly of the blade. The flat work engaging surface of the shoe plate 11 is disposed at right angles to the blade.

In the assembly of Fig. 1 the shoe is shown supported in operative position for sawing through a work piece at 15, a saw cut being indicated at 16. The cutting edges 17 of the blade teeth as will be noted are aligned in a plane at right angles to the upper flat surface of the work piece by reason of the right angular relation of the shoe 11 to the blade. As noted between the line 18, indicating the plane of the teeth, and the line 19, indicating the axis or path of reciprocating movement of the plunger 5, the teeth are lying in a plane at a 6° angle forwardly of the plunger axis and in the direction of the path of the cut being made. Thus, in operation the plunger and casing 1 are forwardly tilted with relation to the teeth or the work surface. The angular relation may be greater or less. It has been found that an angle of at least 6° will afford a maximum cutting action.

As will be noted from the shape of the blade teeth the cutting stroke of the blade will be made on the up-stroke of the plunger. By reason of the forwardly tilted position of the plunger the up-stroke of the blade will thus have a parallelogram-like motion with a horizontal component of forward motion into the work as well as a vertical component of motion. Being set at right angles to the upper surface of the workpiece the teeth will be driven forwardly into the path of the cut as the blade rises and without manually advancing the entire unit of the casing 1 in any way. Accordingly, the weight of the motor and entire unit is a factor utilized in the cutting operation itself. Such weight serves to overcome the resistance to the forward motion of the blade into the work.

It will also be appreciated that on the downstroke the rearward component of motion of the blade serves to clear the blade of sawdust. By taking advantage of the dead weight of the unit to assist the forward cutting movement in this manner the operator's work in pushing and guiding the saw along the path of the cut to be made is rendered that much easier. The unit is supported in operative position automatically by the position of the shoe in flat contact on the surface of the work and as will be appreciated from Fig. 1 no tooth of the blade 10 will be in advance of another tooth with respect to the transverse cut being made in the work as the casing is manually advanced. It will be readily appreciated that the saw arrangement of Fig. 1 may also be stationarily fixed and the work piece 15 guided into the reciprocating blade to make a cut. This may best be seen by viewing Fig. 1 in an upside down position in which the shoe 11 is comparable to a saw table for imparting relative movement between the blade and work by moving the work across the same.

Insofar as is known this particular inter-relationship between the movement of the blade teeth, the plunger, the shoe plate, and the work piece has not been appreciated heretofore. The nearest known prior art is disclosed in the patent to Butz No. 2,621,685 of 1952 in which disclosure is made of a saw blade angularly related to the axis of reciprocation of a plunger. The advantages of the present disclosure over the prior art may be appreciated from a consideration of the operation of the saw as shown by Fig. 2. Inasmuch as the only self-supporting position of rest as exemplified by such prior art is with the plunger normal to the work surface, the plunger 5 has been shown perpendicular thereto with the blade 20 angularly advanced with respect to the axis of reciprocation. The teeth 22 are thus disposed in a plane forwardly and obliquely disposed to the inner end of the kerf 21. The upstroke of the blade 20 thus causes each individual tooth to be drawn straight up with the lowermost teeth engaging the work at a forward position in relation to the upper teeth.

In order to make a smooth cutting pass of the blade 20 the unit in which the plunger is mounted therefore cannot be steadily pressed forwardly into the path of the cut without the likelihood of causing the individual teeth to jam into the work and the entire unit to chatter in operation. Even if held lightly a certain amount of chattering is inevitable. A comparison with the operation of the blade as shown by Fig. 1 will readily indicate the advantage in having the plane of the teeth arranged so that each tooth rakes into the cut after the tooth immediately above it has cleared the way and none of the lower teeth are being thrust into the work in advance of an upper tooth.

The new saw will thus make a faster cut and work more smoothly in operation. Not only will the relatively chatterless operation of the new arrangement as disclosed be more readily appreciated from a comparison with the saw of Fig. 2 but a further advantage will also be seen from a consideration of Fig. 3. In this view the upper surface of a work piece 23 is shown with the beginning of a saw cut in the edge indicated at 24. The cut 24 is along a linear path ending at 25.

The line at 25 indicates the vertical inner end edge of a kerf. It is perpendicularly disposed to the top surface of the work piece when the cut is made by the unit of Fig. 1—that is, the top and bottom of the cut lie in a common plane at right angles to the top surface 26. At 27 an undercut is indicated to illustrate the projection of the lower portion of a cut as made by an angularly advanced blade arranged as in Fig. 2. The bottom end edge at 28 is thus forwardly of the upper end edge 25.

When a cut on an arcuate path is desired, such as is shown by Fig. 3 at the inner end of the slot 24 (as, for example, to remove the portion 29 to be cut out along a scribed indicator line 30), the outer edge of the saw will normally be guided to cut along the inner edge of the indicator line 30 just as the saw was initially guided to cut along the edge 31 of the straight line of the slot 24. As will be readily seen from the above explanation the unit of Fig. 1 may be turned to follow the line 30 and the curved arcuate cut made at the edge of the work piece 23 will be even and a straight perpendicular projection of the line 30. Where the top line is followed the lower end of the saw automatically stays even with it. At 32 the inner edge of the kerf of the slot is indicated, the dotted line 33 indicating the inner edge continuation thereof as will be made by the saw when the outer saw edge follows the line 30. Thus the edge of the cut-out portion 29 will likewise be even and squared off.

The slot made by a saw blade operating after the manner of Fig. 2 coincides at its edges with the edges of the linear slot 24. But as the undercut 27 will show, the blade 20 will be guided along line 30 with the lower portion thereof continuing the undercut as along a line indicated by the dot-dash line 34. Thus an uneven edge results in the body of the work piece 23 and in the cut edge of the portion 29 since the lower end of the saw is leading the upper as it turns around a curve.

What is claimed is:

1. In a portable saw having a body member, a saw-bar endwise reciprocatory along an axis fixed with respect to the body member, an open-ended saw-blade having cutting teeth forming a cutting line, means for removably securing the saw-blade to one end of the saw-bar with the cutting-line at a definite small angle to the saw-bar axis, and a sole-plate secured to the saw body member and presenting a planar surface for contact with the work, the cutting-line of the saw-blade being normal to the planar surface of the sole-plate.

2. In a portable saw of the sabre-jig type having a body member, a saw-bar endwise reciprocatory along an axis tipped forward at the top from the vertical in the normal direction of saw feed, an open-ended saw-blade formed with teeth defining a cutting-line, a sole-plate secured to the body member and presenting a horizontal planar surface for contact with the work, and means for removably securing the saw-blade to one end of the saw-bar so that the cutting-line of the teeth stands at right angles to the planar surface of the sole-plate and at a definite small angle to the saw-bar axis.

References Cited in the file of this patent

UNITED STATES PATENTS

| 2,621,685 | Butz | Dec. 16, 1952 |
| 2,639,737 | Forsberg | May 26, 1953 |
| 2,737,984 | Bruck | Mar. 13, 1956 |
| 2,746,493 | Babcock | May 22, 1956 |